United States Patent
Van Schaftingen et al.

(10) Patent No.: US 6,866,812 B2
(45) Date of Patent: Mar. 15, 2005

(54) PROCESS FOR MANUFACTURING HOLLOW PLASTIC BODIES

(75) Inventors: Jules-Joseph Van Schaftingen, Wavre (BE); Yannick Gerard, Kraainem (BE); Stéphane Leonard, Brussels (BE); Serge Dupont, Vilvoorde (BE); Joël Op De Beeck, Duffel (BE)

(73) Assignee: SOLVAY (Societe Anonyme), Brussels (BE)

(*) Notice: Subject to any disclaimer, the term of this patent is extended or adjusted under 35 U.S.C. 154(b) by 630 days.

(21) Appl. No.: 09/741,811

(22) Filed: Dec. 22, 2000

(65) Prior Publication Data

US 2001/0015513 A1 Aug. 23, 2001

(30) Foreign Application Priority Data

Dec. 22, 1999 (BE) .............................. 9900830

(51) Int. Cl.⁷ .............................. B29C 49/20
(52) U.S. Cl. .................. 264/515; 264/516; 264/545; 264/146; 264/152
(58) Field of Search .................. 264/515, 516, 264/545, 146, 152

(56) References Cited

U.S. PATENT DOCUMENTS 4,952,347 A    8/1990  Kasugai

FOREIGN PATENT DOCUMENTS

| JP | 59-109329    |   | 6/1984 |
|----|--------------|---|--------|
| JP | 359109328 A  | * | 6/1984 |
| JP | 61-32735     |   | 2/1986 |
| JP | 4-244828     |   | 9/1992 |
| JP | 7-156255     |   | 6/1995 |

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

Process for manufacturing hollow plastic bodies, especially motor-vehicle fuel tanks, from an extruded parison of closed cross section, in which at least one cut is made in the parison which is then formed by molding.

45 Claims, 1 Drawing Sheet

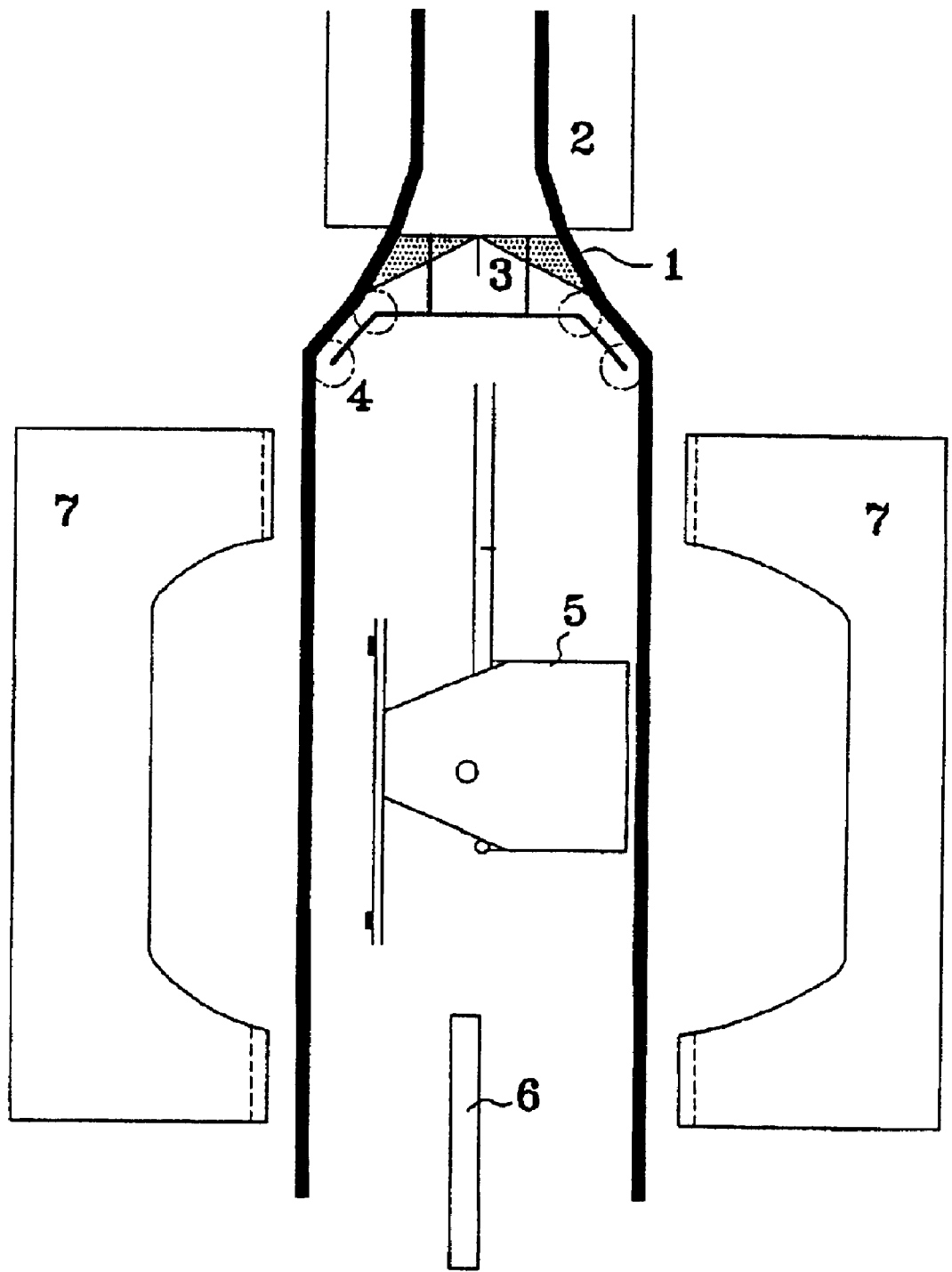

PROCESS FOR MANUFACTURING HOLLOW PLASTIC BODIES

The present invention relates to a process for the manufacture of hollow plastic bodies.

Hollow plastic bodies are used in a number of diverse and varied industries for many uses, especially as gas and liquid tanks. For certain particular uses, these hollow bodies often have to meet sealing standards in relation to the environmental requirements with which they must comply. At the present time, both in Europe and in the world, there is a considerable tightening of the requirements relating to limiting the leakage of pollutants into the atmosphere and into the environment in general. The design of hollow bodies intended to contain liquids and gases is consequently moving rapidly towards techniques capable of providing a greater guarantee of them being sealed and being safe under varied operating conditions. Moreover, endeavours have also been made to reduce as far as possible the losses arising from the various ducts and accessories associated with the hollow bodies. Sometimes one means used has been to incorporate certain accessories and ducts actually within the hollow bodies, thus eliminating any interface between them and the external atmosphere.

The insertion of accessories into a parison intended subsequently to be blown in order to produce a hollow body is itself well known and found in many industrial applications in the manufacture of hollow bodies, particularly in that of liquid and gas tanks.

However, inserting accessories into a closed cylindrical parison proves to be tricky when they are bulky: this is because it is important for the parison to cover the accessories without interfering with them before the blowing operation is carried out.

U.S. Pat. No. 4,952,347 discloses a process for manufacturing a plastic fuel tank which comprises the extrusion of two parallel flat sheets between which the accessories are inserted. The two sheets are then moulded by bringing together, and closing, two walls of a mould into which a blowing gas is injected and the ends of which produce the weld of the two sheets to each other so as to form the hollow body containing the accessories within it.

However, this process has the drawback of having to position two extrusion heads and/or extruders capable of simultaneously producing two flat sheets, the thickness uniformity and the production uniformity of which are constant from one sheet to another and at any point on each of the sheets.

The object of the invention is to provide a process which avoids the drawbacks of the known processes and allows bulky accessories to be easily and rapidly inserted into and positioned in a hollow body without any risk of producing undesirable irregularities in the walls of the hollow body obtained.

For this purpose, the invention relates to a process for manufacturing hollow plastic bodies from an extruded parison of closed cross section, in which at least one cut is made in the parison which is then formed by moulding.

The term "hollow body" is understood to mean any article whose surface has at least one empty or concave part. In particular, the process according to the invention is well suited to the manufacture of hollow articles which are in the form of closed bodies, such as tanks.

The hollow bodies produced by the process according to the invention are made of plastic, that is to say a material comprising at least one polymer made of synthetic resin.

All types of plastic may be suitable. Plastics that are very suitable belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, without being restrictive: random copolymers, sequenced copolymers, block copolymers and graft copolymers.

Any type of thermoplastic polymer or copolymer whose melting point is below the decomposition temperature is suitable. Synthetic thermoplastics which have a melting range spread out over at least 10 degrees Celsius are particularly suitable. As examples of such materials, there are those which exhibit polydispersity in their molecular mass.

In particular, it is possible to use polyolefins, grafted polyolefins, thermoplastic polymers, polyketones, polyamides and copolymers thereof. One copolymer often used is the copolymer ethylene-vinyl alcohol (EVOH). A blend of polymers or copolymers can also be used, as can a compound of polymeric materials with inorganic, organic and/or natural fillers such as, for example, but not restrictively: carbon, salts and other inorganic derivatives, and natural or polymeric fibres. It is also possible to use multilayered structures consisting of stacked layers fastened to one another, comprising at least one of the polymers or copolymers described above. Such multilayered structures may be obtained by means of a coextrusion head or by a technique of completely or partially covering a substrate layer with one or more other layers. An example of the covering technique is the spraying of plastic onto the substrate layer using a spray gun.

One polymer often used is polyethylene. Excellent results have been obtained with high-density polyethylene (HDPE).

The term "extruded parison" is understood to mean the product obtained by passing, through a die, a composition of at least one thermoplastic melt homogenized in an extruder whose head is terminated by the die. According to the invention, the parison has a closed cross section. Preferably, this cross section is circular or elliptical.

The figure which follows is given for the purpose of illustrating a specific embodiment of the inventions without in any way wishing to restrict the scope theteof. It represents an extrusion blow-moulding machine with continuous extrusion used for producing motor-vehicle fuel tanks.

In accordance with the process according to the invention, at least one cut is made in the parison leaving the die mounted on the extrusion head. The cutting operation consists in cutting the wall of the parison, right through its thickness, in a curve of predetermined shape and length. Preferably, the curve of the cut is rectilinear. Also preferably, the cut is made continuously over the entire length of the parison. Most preferably, the cut is made as a straight line over the entire length of the parison.

Next, the cut parison undergoes a forming operation by moulding, that is to say inserting it between at least two parts of a mould and then closing these parts and pressing at a predetermined temperature for a predetermined time.

Preferably, the moulding operation comprises a blowing operation and a welding operation. These two separate operations may be carried out independently in a sequence in any order. They may also, preferably, be carried out, at least in part, concomitantly.

The blowing operation inside the mould, the walls of which may be maintained at a defined temperature by any suitable heating or cooling means, allows the cut parison to undergo a forming operation.

The welding operation in the mould consists in pinching the periphery of the parison, at least partially, and in welding together, by hot fusion welding, the surfaces of the parison which have been pinched.

Optionally, the hollow body obtained may also undergo a surface treatment. Examples of such surface treatments are, non-restrictively: fluorination, sulphonation and covering with another composition or material.

Preferably, the process is carried out in an integrated manufacturing line comprising the extrusion of the parison and its forming by moulding. In particular, identical parisons are produced by means of a knife blade which cuts, transversely, at regular intervals, the extrudate leaving the die.

Preferably, the parison is cut longitudinally, along a generatrix of the latter. In this case, it is particularly advantageous that this cut be made in the direction of flow of the parison.

One particularly preferred technique is that in which the parison is cut twice over its entire length, that is to say along two separate lines, so as to produce two separate sheets. Cutting along two parallel generatrices is very particularly preferred.

The two sheets obtained may be held apart at a constant distance until the step of closing the mould. As a variant, it is also possible to modify, over time, the spacing of the two sheets until the mould is closed. According to this variant, it is also possible to bring the sheets together at the moment when the mould closes. This makes it possible, advantageously, to reduce the manufacturing scrap.

Another preferred technique is that in which the two parts of the cut parison are held apart at a sufficient distance from each other so that it is possible to insert between them, before moulding, an object intended to be incorporated inside the hollow body. Thus, it is possible in particular to insert a bulky object. It is also possible to combine the double cutting which produces two separate sheets with the technique of keeping the parts of the cut parison apart by a sufficient distance. In the latter case, it is then the separate sheets which are kept apart.

This bulky object may be conventionally introduced via the lower side of the sheets, in the opposite direction to the flow.

More advantageously, this object may be introduced laterally, or even via the top of the sheet. In this way, it is possible to choose the region or the side of the sheet where the available space is least cluttered. This way of proceeding is particularly advantageous in the case of large objects.

In one particular embodiment of the process according to the invention, the sheets obtained by cutting the parison are guided by means of a guiding device. This guiding device may be chosen from among any device for guiding a flattened plastic object, which is itself well known. For example, wheels and/or rollers may be used. The guiding device may also include a device for transversely and/or longitudinally stretching the sheet.

The process according to the invention is beneficial when it is desired to insert into the cut parison at least one accessory intended to be incorporated into the hollow body. The process according to the invention is particularly advantageous when it is desired to insert between the sheets at least one accessory intended to be incorporated into the hollow body.

The term "accessory" is understood to mean any object or device which is generally associated with the hollow body in its usual method of use or operation and which interacts with it in order to fulfil certain useful functions. Non-limiting examples of such accessories are: liquid pumps, pipettes, reservoirs or baffles internal to the hollow body, and ventilation devices.

Preferably, the inserted accessory, especially when it is inserted as several examples, which may or may not be identical, is supported by a preassembled structure. This has the advantage of being able to produce the preassembled structure, supporting all or at the very least several accessories to be introduced into the hollow body, in a separate process prior to their introduction into the hollow body. As a result, the subsequent mounting, by insertion, into the hollow body is greatly facilitated and this allows the production of preassembled structures of relatively complex accessories to be more easily subcontracted.

It is also possible, independently of the above insertion of accessories, to insert, between the sheets, a preassembled structure which comprises at least one device for anchoring this structure to the internal wall of the hollow body. Such a device is, for example, an arm provided with a tab for fastening to the wall of the hollow body. These tabs may, for example, be fastened by welding to the wall of the hollow body, upon closing the mould. Alternatively, they may be judiciously placed so as to be pressed, by jamming, between opposed walls of the hollow body.

The preassembled structure may also be designed so that it also supports an anchoring device which will be used only later for fastening an accessory. One example is the fastening of an accessory which comes from a manufacturer different from that of the preassembled structure and which it would be desirable to insert at the same time as those already present in this structure. Another example could also be the possibility of fastening an accessory after the manufacture of the hollow body, in a step independent of this manufacture, via an opening that would be made in its wall.

Alternatively, it may be advantageous to combine the insertion of at least one accessory on a preassembled structure with the structure having the anchoring device. Here, the benefit resides in reducing the number of objects to be inserted, each of them possibly fulfilling both functions, that of a support for the accessories and that of anchoring them in the wall, or for an accessory to be introduced later.

It is also possible to reheat or cool at least one part of the sheets by any suitable means, such as, for example, but non-restrictively: the radiation from infrared lamps, the convection of hot or cold gases, etc. When the sheets are completely separate over their entire perimeter before they are moulded, it is much easier to bring up and position the heating and/or cooling means.

The process according to the invention is well suited to the use of means for positioning bulky objects and preassembled structures which can be mounted very precisely in the hollow body.

An example of these means is the use of supports in the form of films, sheets or plates made of polyolefin, which are attached to the object or the structure at points such that it is possible to support and move the object or the structure while holding it, by pulling, between grippers. The films, sheets or plates are, for example, attached to the structure at points located at 180° to each other. Advantageously, the films, sheets or plates are extended to the outside of the perimeter of the sheets and thus make it possible to hold and continuously position the object or the structure while the mould is closing. The films, sheets or plates are in this way held between the pinching regions of the parison which are intended to be fastened together. A preferred method of fastening is welding. In this way, the films, sheets or plates melt, at least on the surface, during the operation of welding them to the internal surface of the parison.

The films, sheets or plates generally have thicknesses of at least 5 μm. This thickness generally does not exceed 20 mm. Preferably, films at least 50 μm in thickness are used. These preferred films generally do not exceed 1 mm in thickness. The advantage of using films with such a small thickness is that it limits the losses of gas and/or liquid contained in the hollow body right at the regions where the sheets are joined.

An additional way of precisely positioning the bulky objects or the preassembled structures inside the hollow body is to provide the films, sheets or plates serving as support with plastic cones intended to be inserted precisely in the corresponding relief parts located on the edges of the mould, in the parison welding regions.

The invention also allows the use of moveable moulds and the lateral insertion of a blowing nozzle a few moments before the closing of the mould, this having the advantage of being able to shorten the cycle time and increase the production rates.

The process according to the invention is well suited to the manufacture of hollow bodies which are fuel tanks. In particular, it is suitable for the manufacture of fuel tanks intended to be fitted to motor vehicles.

The tubular multilayer extrudate (1) of circular cross section, which has external layers made of high-density polyethylene and a central barrier layer made of ethylene-vinyl alcohol copolymer (EVOH) surrounded by two layers of adhesive made of maleic-anhydride-grafted polyethylene, leaves the extrusion head (2) and is separated into two sheets (1), using two steel blades (3) placed at 180° to each other, at the exit of the circular die mounted on the extrusion head (2).

The two sheets (1) are guided and kept apart using wheels (not shown) and rollers (4). At the start of a cycle, the two parts (7) of an open mould lie beneath the extrusion head (2). A robot (not shown) then positions the structure (5) supporting the accessories to be incorporated into the tank. A blowing nozzle (6) is also positioned between the two parts of the mould. The latter is then closed around the combination of sheets and accessories, causing the two sheets to be welded together, while blowing air is injected under pressure via the nozzle (6) so as to carry out the forming operation on the sheets.

What is claimed is:

1. A process of manufacturing a hollow body for receiving a liquid, comprising the steps of:
   extruding a parison;
   cutting through said parison so as to form two portions separated by a cut; and
   molding said two portions so as to form said hollow body for receiving said liquids,
   wherein said step of cutting said parison comprises making at least two cuts in said parison so as to form two separate sheets.

2. The process of claim 1, wherein said hollow body is a tank and said liquid is a fuel.

3. The process of claim 1, wherein said step of molding comprises:
   pinching surfaces of said parison, and
   hot fusion welding said surfaces.

4. The process of claim 1, wherein said step of cutting is Performed along a longitudinal direction.

5. The process of claim 1, wherein said step of extruding said parison comprises passing a composition of at least one thermoplastic melt through a die.

6. The process of claim 1, further comprising a step of cutting said parison in a transverse direction thereby obtaining a plurality of parisons.

7. The process of claim 1, wherein said step of molding comprises a step of holding apart said two portions of said parison and a subsequent step of bring said two portions together.

8. The process of claim 7, further comprising a step of inserting an object in said parison during said step of holding apart said two portions.

9. The process of claim 8, wherein said object is a preassembled structure.

10. The process of claim 9, wherein said preassembled structure is configured to anchor to an internal wall of said hollow body.

11. The process of claim 8, further comprising a step of controlling a position of said object with members, said members being coupled to said object and extending outside said parison while said object is inside said parison.

12. The process of claim 11, wherein said members melt during said molding step.

13. The process of claim 1, wherein said step of molding comprises a step of blowing gas within said parison, and a step of welding said two portions together.

14. The process of claim 1, wherein said step of molding comprises a step of bringing said two portions together and a step of welding said two portions together so as to form a joint leak-tight to said liquid.

15. The process of claim 1, further comprising a step of guiding said sheets with a guiding device.

16. A process of manufacturing a hollow body, comprising the steps of:
   extruding a multilayered parison comprising stacked layers fastened to each other;
   cutting through said multilayered parison so as to form two portions separated by a cut; and
   molding said two portions so as to form said hollow body,
   wherein said step of cutting said multilayered parison comprises making at least two cuts in said multilayered parison so as to form two separate sheets.

17. The process of claim 16, wherein said hollow body is a fuel.

18. The process of claim 16, wherein said multilayered parison comprises at least one layer of a thermoplastic.

19. The process of claim 16, wherein said multilayered parison comprises at least one layer of polyethylene.

20. The process of claim 16, wherein said step of molding comprises:
   pinching surfaces of said parison, and
   hot fusion welding said surfaces.

21. The process of claim 16, wherein said step of cutting is performed along a longitudinal direction.

22. The process of claim 16, wherein said step of extruding said multilayered parison comprises passing a composition of at least one thermoplastic melt through a die.

23. The process of claim 16, further comprising a step of cutting said parison in a transverse direction thereby obtaining a plurality of parisons.

24. The process of claim 16, wherein said step of molding comprises a step of holding apart said two portions of said parison and a subsequent step of bringing said two portions together.

25. The process of claim 24, further comprising a step of inserting an object in said parison during said step of holding apart said two portions.

26. The process of claim 25, wherein said object is a preassembled structure.

27. The process of claim 26, wherein said preassembled structure is configured to anchor to an internal wall of said low body.

28. The process of claim 25, further comprising a step of controlling a position of said object with members, said members being coupled to said object and extending outside said parison while said object is inside said parison.

29. The process of claim 28, wherein said members melt during molding step.

30. The process of claim 16, wherein said step of molding comprises a step of blowing gas within said parison, and a step of welding said two portions together.

31. The process of claim 16, wherein said step of molding comprises a step of bringing said two portions together and a step of welding said two portions together so as to form a leak-tight joint.

32. A process of manufacturing a fuel tank, comprising the steps of:

extruding a parison;

cutting through said parison so as to form two portions separated by a cut; and molding said two portions so as to form said fuel tank, wherein said step of cutting said parison comprises making at least two cuts in said parison so as to form two separate sheets.

33. The process of claim 32, further comprising a step of positioning fuel tank accessories between said two portions prior to a step of bringing said two portions together.

34. The process of claim 32, wherein said step of molding comprises:

pinching surfaces of said parison, and hot fusion welding said surfaces.

35. The process of claim 32, wherein said step of cutting is performed along a longitudinal direction.

36. The process of claim 32, wherein said step of extruding said parison comprises passing a composition of at least one thermoplastic melt through a die.

37. The process of claim 32, further comprising a step of cutting said parison in a transverse direction thereby obtaining a plurality of parisons.

38. The process of claim 32, wherein said step of molding comprises a step of holding apart said two portions of said parison and a subsequent step said two portions together.

39. The process of claim 38, further comprising a step of inserting an object in said parison during said step of holding a part said two portions.

40. The process of claim 39, wherein said object is a preassembled structure.

41. The process of claim 40, wherein said preassembled structure is configured to anchor to an internal wall of said fuel tank.

42. The process of claim 39, further comprising a step of controlling a position of said object with members, said members being coupled to said object and extending outside said parison while said object is inside said parison.

43. The process of claim 42, wherein said members melt during said molding step.

44. The process of claim 32, wherein said step of molding comprises a step of blowing gas within said parison, and a step of welding said two portions together.

45. The process of claim 32, wherein said step of molding comprises a step of bringing said two portions together and a step of welding said two portions together so as to form a leak-tight joint.

* * * * *